May 14, 1957 W. P. WILSON 2,792,289
EXTRACTION METHOD AND APPARATUS
Filed June 16, 1954 2 Sheets-Sheet 1

INVENTOR.
WILLIAM P. WILSON
BY
Pennie, Edmonds, Morton,
Barrows & Taylor
HIS ATTORNEYS May 14, 1957 W. P. WILSON 2,792,289
EXTRACTION METHOD AND APPARATUS
Filed June 16, 1954 2 Sheets-Sheet 2

INVENTOR.
WILLIAM P. WILSON
BY
Pennie, Edmonds, Morton, Barrows and Taylor
HIS ATTORNEYS

United States Patent Office 2,792,289
Patented May 14, 1957

2,792,289

EXTRACTION METHOD AND APPARATUS

William P. Wilson, Carlsbad, N. Mex., assignor to United States Borax & Chemical Corporation, a corporation of Nevada Application June 16, 1954, Serial No. 437,031

11 Claims. (Cl. 23—310)

This invention relates to improvements in method and apparatus for extracting valuable products from ores, or other solid granular material, by countercurrent decantation leaching; and more particularly for the extraction of potassium chloride from sodium chloride-potassium chloride ores.

The object of the invention is to provide a method which is more economical to employ than those heretofore available because of the ability to remove a remarkably high percentage of the values from the ore and because of the ability to treat an unusually large quantity of ore per day with the utilization of apparatus of reasonable size and cost, and further, because the improved process can be carried out with a comparatively small crew of operators.

The object of the invention, also, is to provide an apparatus for carrying out the improved method which does not occupy an excessive amount of space and involve excessive capital outlay, or require an undue amount of power for its operation, and which can be conveniently and economically serviced.

According to the method of the present invention the countercurrent decantation leaching is carried out in a plurality of bodies of liquid contained in suitable vessels, and such bodies having the solids which are to be extracted in suspension therein, these bodies of liquid being arranged in a series at progressively higher elevations. The ore to be treated is fed into the lowermost of these bodies of liquid, and the dissolving liquid is supplied to the uppermost of such bodies. The mixture of liquids and solids in the lowermost body is continuously agitated to maintain the solids in suspension and promote their dissolution. In the remaining bodies of the series a combination of liquid pumping and agitation is continuously carried on, the pumping action serving to transfer the mixture of liquids and solids from the lower portion of each of said bodies to the bottom of the next higher body, and the agitating action being carried on above the lower portion of liquid in each of the bodies for the purpose of preventing the solids in the upper portion from settling and also to promote their dissolution in the liquid. The solids are thus progressively subjected to extraction as they are raised to the uppermost tank.

The process further comprises transferring solution in a quiescent state from the top of each of said bodies to the top of the liquid in the next lower body, so that the solution flows generally downward, increasing in percentage of dissolved solids. Finally the process includes the removing of the liquid and solids mixture from the lower portion of the uppermost body and withdrawing the end solution rich in the dissolved solids from the top of the lowermost body for further treatment. It is also advantageous to separate the liquid from the final mixture of liquid and solids in a suitable dewatering apparatus and to return such liquid to the uppermost of the series of bodies of liquid referred to.

Although the present improvements can be employed in the treatment of various granular materials, the method and apparatus of the invention are particularly advantageous for the countercurrent leaching of ore composed principally of sodium chloride and potassium chloride with a hot saturated solution of sodium chloride weak in potassium chloride, and they will accordingly be described in detail in connection with the treatment of such ore.

The several bodies of liquid referred to above are contained in a series of vessels or tanks, five in number in the present instance. The first four of these tanks comprise the series of countercurrent leaching tanks, whereas the fifth and uppermost tank is used to withdraw the mixture of solids and liquid from the final leaching tank for the separation from the solution of the solids to be discarded.

The solubility of sodium chloride in a hot solution and in a cold solution does not differ very much, but potassium chloride is much more soluble in the above hot solution than in cold solution. The temperature of the solution throughout the tanks is kept elevated. Because of the sodium chloride-weak potassium chloride solution is saturated in sodium chloride when it is added, it does not dissolve sodium chloride from the ore. But, since the solution added contains less potassium chloride, it is capable of taking up a considerable amount of potassium chloride, so that by proper regulation of the countercurrent flow there is substantially complete extraction of the potassium chloride from the ore, and the hot solution drawn off from the lowermost tank has a sufficiently high concentration of potassium chloride so that in subsequent operations it can be separated from the sodium chloride by cooling.

Further details of both the method and apparatus of the present invention will be understood from a consideration of the accompanying drawings. In these drawings.

Figures 1, 2:
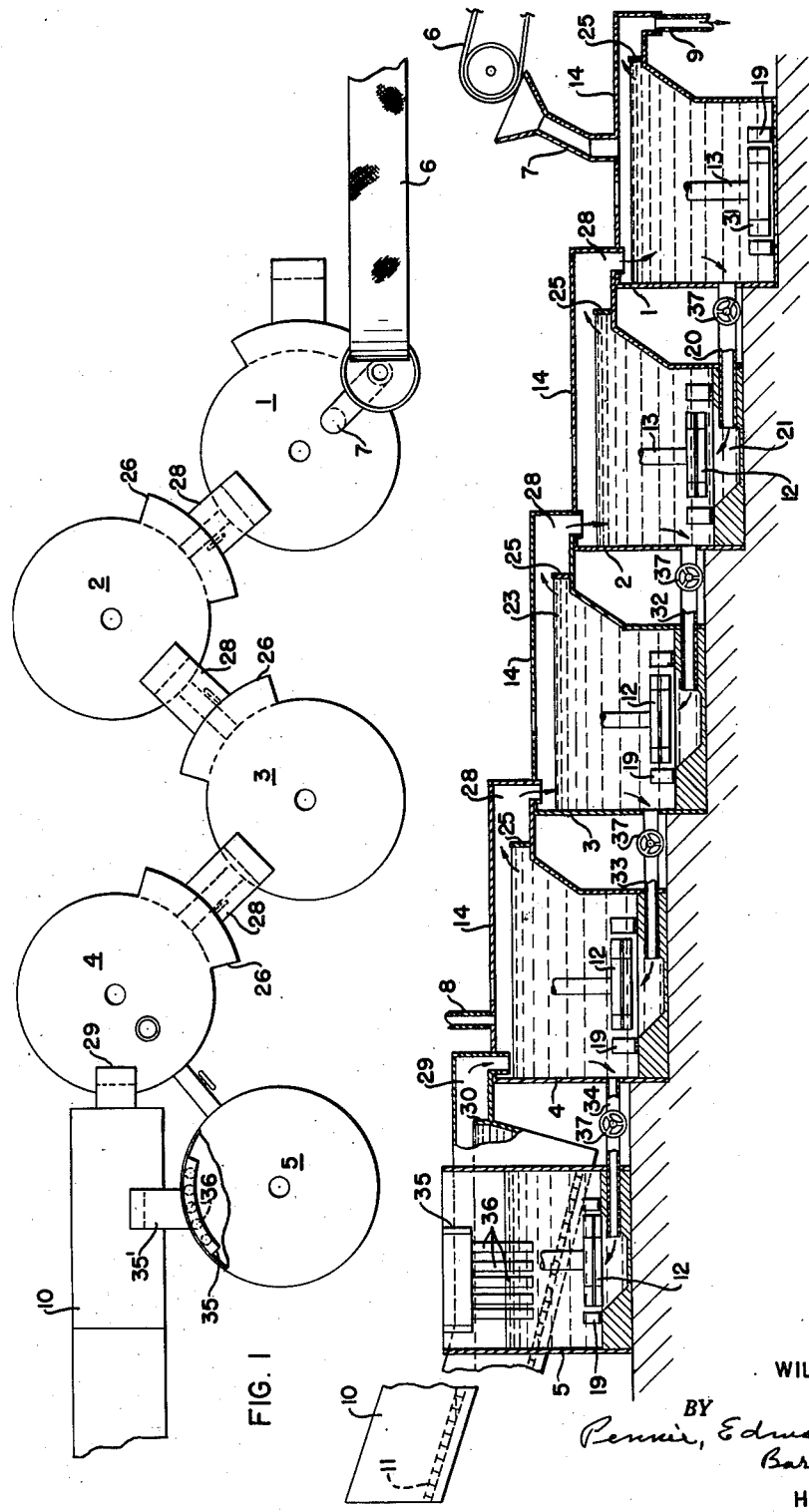
Fig. 1 is a diagrammatic plan view of the apparatus.
Fig. 2 is a diagrammatic view of the apparatus in vertical section with the several tanks shown in line with one another instead of in staggered relation as shown in Fig. 1.
Figure 5:
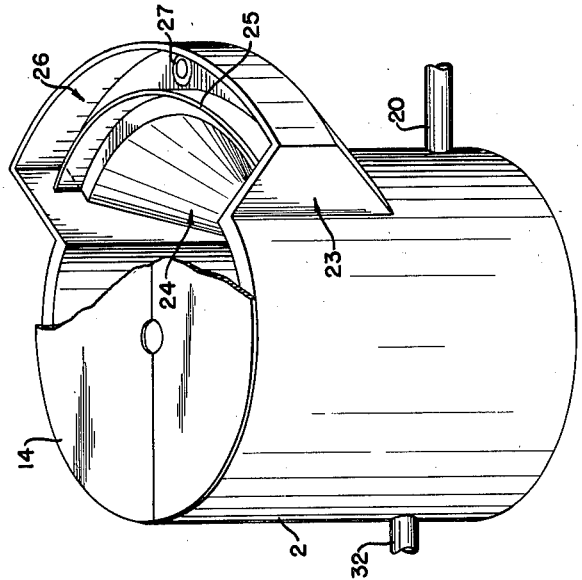
Fig. 5 is a projectional or perspective view of one of the mixing tanks.

Referring to these drawings, the apparatus of the invention comprises a pluraltiy of specially constructed vessels or tanks 1, 2, 3, 4 and 5 which are advantageously arranged in staggered relation, as shown in Fig. 1.

These tanks are arranged at progressively higher elevations, tank 1 being the lowest and tank 5 the highest. The sodium and potassium chloride ore is fed by means of a conveyor 6 and a chute 7 into the top of the first or lowest tank or vessel 1, and the leaching or treatment liquid, namely, a hot saturated solution of sodium chloride weak in potassium chloride is supplied to the top of tank 4 through a pipe 8.

The countercurrent leaching action takes place in the series of tanks comprising tanks 1, 2, 3 and 4. Tank 5 operates as a transfer apparatus as will be described.

The end product containing the values to be recovered is discharged from the lowermost tank 1 through an outlet pipe 9, this product comprising a saturated solution of potassium and sodium chlorides. This solution is carried through pipe 9 to further treatment where the potassium chloride is separated from the solution.

The second end product of the process, namely, the sodium chloride solids are removed from the lower portion of leaching tank 4 through tank 5 and a dewatering apparatus 10 which may, for example, be a rake classifier as indicated in Figs. 1 and 2. Any other suitable dewatering apparatus may be employed, such as a screw classifier, drag dewaterer or dewatering screen. In the rake classifier illustrated, the solids are carried upwardly by the motion of the rake mechanism 11 and discharged from the upper end of the classifier to be disposed of in any convenient way. The liquid from the rake classifier 10 is returned to the leaching system, as will later be described.

Figure 3:
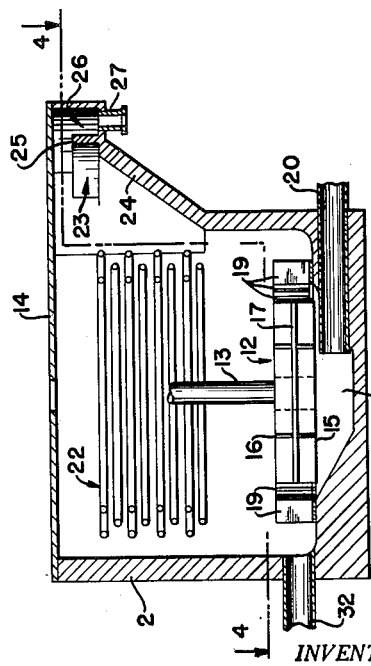
Fig. 3 is a view showing in vertical central section one of the tanks substantially as actually constructed.

The vessels or tanks 2, 3 and 4 are alike in construction and each is cylindrical in shape and provided with a rotary, divided or double impeller 12 at the bottom. This impeller is mounted at the lower end of a vertical shaft 13 which extends through the cover member 14 and is driven in any suitable manner. Impeller 12 is provided with a lower set of blades 15 and an upper set 16, shown in detail in Figs. 3 and 4, and separated or divided by means of a continuous horizontal disc or plate 17 which is of the same diameter as the turbine blades. This plate and the two sets of blades are secured together by means of a series of bolts 18 shown in Fig. 4. Surrounding and in slightly spaced relation from the impeller 12 there is a series of stationary deflector blades 19 to keep the liquid from swirling.

The lower blades 15 of the impeller 12 operate as pumping blades and draw a mixture of liquid and solids in suspension therein through an inlet pipe 20 from the next lower tank into the throat 21 immediately below impeller 12 from which this mixture, or slurry, is thrown outwardly by the impeller blades and discharged against the side walls of the tank. The slurry striking these walls is deflected upwardly. The purpose of the upper set of blades 16 is to produce a circulation and mixture of the solids with the liquid in the upper portion of the tank above the impeller and to promote the dissolving of these solids by this liquid.

Figure 4:
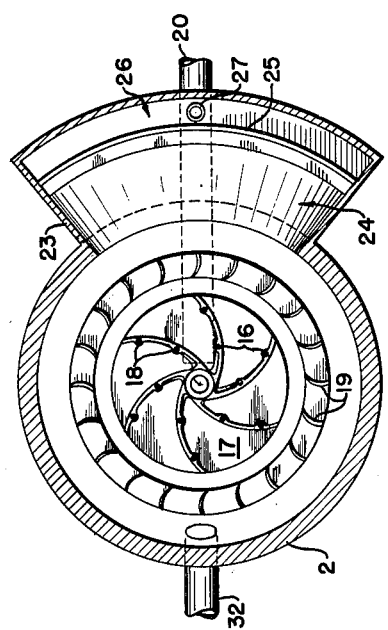
Fig. 4 is a horizontal section taken on broken line 4—4 of Fig. 3.

Each of the tanks, 1–5, is provided with a heating coil such as that indicated at 22 in Fig. 4, through which stream is passed, for the purpose of maintaining the solutions in the several tanks at an elevated temperature, in the vicinity of the boiling point of the solution, that is, about 205–210° F. These heating coils have been omitted in Figs. 1 and 2 for the sake of clarity, and in Fig. 4, only the coil itself is illustrated, the supports and inlet and outlet connections, being omitted.

At one side of each of tanks 2, 3, 4, and also of lowermost tank 1, there is provided a settling or decanting portion 23. This settling basin is in the form of a portion of an inverted cone projecting outwardly from the upper portion of the cylindrical tank. It is provided with a downwardly sloping conical interior surface 24, a weir 25, and a launder 26. The launder is provided with a suitable discharge spout 27, which, in the case of the lowermost tank 1, is connected to the outlet or discharge pipe 9 for the end solution of potassium and sodium chlorides. For each of tanks 2, 3, and 4 spout 27 may discharge into a covered trough 28 which conveys the liquid to the top of the next lower tank, or these troughs 28 may be formed as a continuation of the respective launders 26, as indicated diagrammatically in Figs. 1 and 2, which convey the liquid overflowing respectively weirs 25 into the next lower tank.

Decanting portion 23 in each of the tanks provides an area at one side of the tank out of the path of upward circulation of the mixture of liquids and solids produced by the impeller where the mixture of liquids and solids may become quiet so that the undissolved solids may fall toward the bottom. This allows clear, or nearly clear, liquid to overflow the weir 25 into the next tank, or into the discharge outlet 9.

The slope of conical surface 24 is about 55° from the horizontal or sufficiently steep for the settling on particles of ore on this surface to slide downwardly into the lower portion of the tank. It is advantageous to have the conical section intersect the cylindrical section of the tank at about half the height of the cylindrical section; also to have the arcuate length of the weir 25 correspond to about ⅓ of the circumference of the tank.

The liquid which has been separated from the solids in dewatering apparatus 10 is returned to the leaching system. Referring to Figs. 1 and 2, such liquid, overflowing a weir 30 at the right-hand end of dewatering apparatus 10, is conveyed by a trough 29 to the uppermost tank 4 of the series of countercurrent leaching tanks, that is, the same tank into which the hot dissolving solution of sodium chloride-weak in potassium chloride is fed through pipe 8.

Returning now to a consideration of the turbine impellers, the impeller 31 in lowermost tank 1 is similar to the impellers 12 in the other four tanks, except that the central dividing plate 17 is omitted so that impeller 31 has only a single set of blades. The purpose of impeller 31 is solely to agitate the mixture of liquids and solids in lowermost tank 1, that is to say, to intermix the incoming ore from chute 7 with the solution entering through trough 28.

In this way as much as possible of the potassium chloride in this ore is dissolved in this tank and the solution is brought close to saturation with potassium chloride before it is discharged through pipe 9. Impeller 31, however, is surrounded with stationary deflector plates 19 the same as the other impellers so as to cause circulation and not mere rotation or swirling of the liquid in the tank.

While all of the tanks are of substantially the same size, the speed of the impellers 12 and 31 in tanks 1—4 and the depths of the several tanks are so arranged as to provide the required stirring action to hold the solids in suspension in the bottom sections of the tanks, but not sufficient to cause the larger particles of the solids to circulate to the top of the tanks. Should any such particles reach the upper portion of any tank, they are eliminated in the settling section, where they are returned along the sloping conical surface 24 to the bottom portion of the tank.

The mixture of liquid and solids in suspension in the bottom sections of the respective tanks is gradually worked upwardly in the tank series by means of the impellers 12. Thus the impeller 12 in tank 2 draws in such a mixture from the lower portion of tank 1 through pipe 20, while the impeller 12 in tank 3 similarly draws in a mixture of liquids and solids from the lower portion of tank 2 through pipe 32. Also the impeller 12 in tank 4 draws a mixture of liquids and solids from tank 3 through pipe 33. In this way the solids are gradually worked upwardly from the lowermost tank to the last tank of the decantation series, namely, tank 4, while in the upper section of each of tanks the solids are maintained in suspension and brought into intimate contact with the hot dissolving solution of sodium chloride weak in potassium chloride.

The function of the uppermost tank 5 is to withdraw through pipe 34 from the lower portion of tank 4 the mixture of solids and liquids in this tank, the solids consisting primarily of sodium chloride particles, and deliver such mixture to dewatering apparatus 10 through a trough 35'. There is no decantation from tank 5, and in place of a weir and launder a box 35 discharging into trough 35' is provided with a series of downwardly extending intake tubes 36 which are arranged close to the side wall of the tank where they will be in the direct line of the upward flow of solids which are deflected upwardly by the walls of this tank after being forced outwardly by the impeller. The lower ends of tubes 36 are also positioned at the point of maximum density of liquids and solids. Hence, tank 5 serves as an apparatus for transferring the mixture of liquid and solids from tank 4 to the dewatering apparatus 10, and in this apparatus the dewatered solids are removed from the leaching system while the overflow liquid is returned to the leaching system as previously mentioned.

In starting the operation of the system, it is first filled with hot saturated dissolving liquid, namely, a saturated solution of sodium chloride weak in potassium chloride maintained substantially at the boiling temperature, this liquid being supplied through pipe 8 into tank 4. With all of the impellers 12 and 31 running the liquid will be pumped first into tank 5 and then into dewatering apparatus 10 to overflow weir 30 and return into tank 4. Upon the filling of tank 4, the liquid will overflow weir 25 in this tank to fill tank 3. This filling process will continue until the entire system is filled with the liquid. The flow from feed pipe 8 can now be cut off, and the liquid will continue to recirculate up through the series of tanks, being carried up by the action of the several impellers and flowing downward again by gravity. A valve 37 may be provided in each of the several pipes 20, 32, 33, and 34, and these valves are now adjusted to limit the flow to the required proportion for carrying the ore, namely, about 2 pounds of liquor per pound of ore when the system is operating at maximum capacity.

Ore is now admitted to the lowermost tank 1 through the chute 7, and the feeding of the ore is continued without the introduction of the liquor from pipe 8 until the proper concentration of liquor is obtained in the several tanks.

The hot dissolving liquid is then started through pipe 8, and the feeding of liquid is continued in proper proportions to give a saturated, or substantially saturated, solution of potassium chloride (and sodium chloride) in the outlet over weir 25 of lowermost tank 1 and into pipe 9. Such operation can be continued indefinitely with the ore and dissolving liquid being fed at the proper rates.

Tests show that approximately 40 percent of the potassium chloride may be dissolved in the first step, tank 1; about 24 percent in the second step, tank 2; and about 12 percent in each of the third and fourth steps, in tanks 3 and 4.

As previously mentioned, tank 5 acts as a transfer device to remove the slurry from tank 4 and deliver it to the dewatering apparatus 10, but it also increases the retention time of the leached ore in the liquor which is weak in potassium chloride, and aids the final extraction.

The pumping mixing action is unique in that it can be carried out in much larger vessels than previously estimated by reputable designers by use of the divided impellers, said impeller giving higher lift than supposed, that is, up to 24 inch lift at 1000 gallons per minute flow.

I claim:

1. The method of countercurrent decantation leaching which comprises providing a plurality of bodies of liquid having solids in suspension therein, arranging said bodies at progressively higher elevations, feeding ore into the lowermost of said bodies of liquid, supplying dissolving liquid to the uppermost of said bodies, agitating the liquid in the lowermost body to maintain the solids in suspension and promote dissolution, transferring mixed liquid and solids from the lower portion of each of said bodies directly to the bottom of the next higher body, agitating the liquid above the lower portion of liquid in each of said bodies to prevent solids from settling and to promote dissolution thereof in the liquid while transferring solution from the top of each of said bodies to the top of the next lower body, removing the liquid and solids mixture from the lower portion of the uppermost body of liquid, and withdrawing solution rich in dissolved solids from the top of the lowermost of said bodies.

2. The method of countercurrent decantation leaching which comprises providing a plurality of bodies of liquid having solids in suspension therein, arranging said bodies in a leaching system at progresisvely higher elevations, feeding ore into the lowermost of said bodies of liquid, supplying dissolving liquid to the uppermost of said bodies, agitating the liquid in the lowermost body to maintain the solids in suspension and promote dissolution, transferring mixed liquid and solids from the lower portion of each of said bodies directly to the bottom of the next higher body, agitating the liquid above the lower portion of liquid in each of said bodies to prevent solids from settling and to promote dissolution thereof in the liquid while transferring solution from the top of each of said bodies to the top of the next lower body, removing the liquid and solids mixture from the lower portion of the uppermost body of liquid, separating the liquid from said solids, returning the liquid to said leaching system, and withdrawing the solution rich in dissolved solids from the top of the lowermost of said bodies.

3. The method of countercurrent decantation leaching of sodium chloride-potassium chloride ores which comprises providing a plurality of bodies of hot saturated sodium chloride-weak in potassium chloride solution having sodium and potassium chlorides in suspension therein, arranging said bodies at progressively higher elevations, feeding said ore into the lowermost of said bodies of liquid, supplying hot saturated sodium chloride solution to the uppermost of said bodies, agitating the liquid in the lowermost body to maintain the chlorides in suspension and promote dissolution, transferring mixed liquid and chloride solids from the lower portion of each of said bodies directly to the bottom of the next higher body, agitating the liquid above the lower portion of liquid in each of said bodies to prevent the chlorides from settling and to promote dissolution thereof in the liquid, while transferring solution from the top of each of said bodies to the top of the next lower body, removing the liquid and chloride solids mixture weak in potassium chloride from the lower portion of the uppermost body of liquid, and withdrawing solution rich in dissolved potassium chloride from the top of the lowermost of said bodies.

4. The method of countercurrent decantation leaching of sodium chloride-potassium chloride ores which comprises providing a plurality of bodies of hot saturated sodium chloride solution unsaturated in potassium chloride and having sodium and potassium chlorides in suspension therein, arranging said bodies in a leaching system at progressively higher elevations, feeding said ore into the lowermost of said bodies of liquid, supplying hot saturated sodium chloride solution unsaturated in potassium chloride to the uppermost of said bodies, agitating the liquid in the lowermost body to maintain the chlorides in suspension and promote dissolution, transferring mixed liquid and chloride solids from the lower portion of each of said bodies directly to the bottom of the next higher body, agitating the liquid above the lower portion of liquid in each of said bodies to prevent the chlorides from settling and to promote dissolution thereof in the liquid, while transferring solution from the top of each of said bodies to the top of the next lower body, removing the liquid and chloride solids mixture weak in potassium chloride from the lower portion of the uppermost body of liquid, separating the liquid from said solids, returning the liquid to said leaching system, and withdrawing solution rich in dissolved potassium chloride from the top of the lowermost of said bodies.

5. In a countercurrent decantation leaching apparatus, a series of tanks each having an overflow for liquid at the top and a slurry outlet near the bottom, said tanks being disposed at successive higher elevations with the overflow from each tank discharging into the upper and the end of the next lower tank, means for feeding ore into the lowermost tank of said series, means for supplying dissolving liquid to the uppermost tank, means for withdrawing a mixture of liquid and solids in suspension therein from the outlet of each tank and delivering it directly to the lower portion of the next higher tank, means in each tank for agitating the contents thereof to maintain the solids in suspension and to promote dissolution in the liquid, and means for withdrawing slurry from the lower portion of the uppermost of said tanks, the end solution rich in dissolved ore overflowing from the lowermost tank of said series.

6. In a countercurrent decantation leaching apparatus, a series of tanks each having an overflow for liquid at the top and a slurry outlet near the bottom, said tanks being disposed at successively higher elevations with the overflow from each tank discharging into the upper portion of the next lower tank, means for feeding ore into the lowermost tank of said series, means for supplying dissolving liquid to the uppermost tank, means for withdrawing a mixture of liquid and solids in suspension therein from the outlet of each tank and delivering it directly to the lower portion of the next higher tank, means in each tank for agitating the contents thereof to maintain the solids in suspension and to promote dissolution in the liquid, a dewatering unit for separating the solids from a mixture of solids and liquid, means for transferring slurry from the lower portion of the uppermost of said tanks to said dewatering apparatus, and means for returning the liquid from said apparatus to said uppermost tank, the end solution rich in dissolved ore overflowing from the lowermost tank of said series.

7. In a countercurrent decantation leaching apparatus, a series of tanks each having an overflow for liquid at the top and a slurry outlet near the bottom, said tanks being disposed at successively higher elevations with the overflow from each tank discharging into the upper portion of the next lower tank and the end solution overflowing from the lowermost tank, means for feeding ore into the lowermost tank of said series, means for supplying dissolving liquid to the uppermost tank, a turbine impeller disposed near the bottom of each tank and mounted for rotation on a vertical shaft, a series of stationary deflector blades surrounding each of said impellers, the impeller in each of said tanks having a set of agitating blades to maintain the solids in suspension in the upper portion of the tank and to cause them to dissolve in the liquid, and the impeller in each of said tanks above the lowermost tank having a set of pumping blades for drawing in a mixture of liquid and solids in suspension therein from the lower portion of the next lower tank.

8. A countercurrent leaching apparatus as claimed in claim 7 in which the impeller is constructed with an upper set of blades, a lower set of blades and a circular dividing plate disposed between said upper and lower blade sets so that the lower blades operate as pumping blades and the upper set as agitating blades.

9. In a countercurrent decantation leaching apparatus, a series of tanks each having an overflow for liquid at the top and a slurry outlet near the bottom, said tanks being disposed at successively higher elevations with the overflow from each tank discharging into the upper portion of the next lower tank, means for feeding ore into the lowermost tank of said series, means for supplying dissolving liquid to the uppermost tank, a turbine impeller disposed near the bottom of each tank and mounted for rotation on a vertical shaft, a series of stationary deflector blades surrounding each of said impellers, the impeller in each of said tanks having a set of agitating blades to maintain the solids in suspension in the upper portion of the tank and to cause them to dissolve in the liquid, and the impeller in each of said tanks above the lowermost tank having a set of pumping blades for drawing in a mixture of liquid and solids in suspension therein from the lower portion of the next lower tank, a dewatering unit for separating the solids from a mixture of solids and liquid, means for transferring slurry from the lower portion of the uppermost of said tanks to said dewatering apparatus, and means for returning liquid from said apparatus to said uppermost tank, the end solution rich in dissolved ore overflowing from the lowermost tank of said series.

10. In a leaching apparatus, a cylindrical tank having a decantation section projecting from the upper portion at one side thereof, a turbine impeller disposed near the bottom of the tank and mounted on a vertical shaft disposed centrally of the tank, means for rotating the impeller to cause circulation and agitation of the liquid and solids mixture within the upper cylindrical portion of the tank, the liquid in said decantation portion being out of the path of the circulation produced by the impeller so as to allow the dissolved solids to settle, said decantation portion having a steeply sloping interior surface along which the settled solids slide and return to the cylindrical portion of said tank, an overflow weir near the periphery of said decantation portion, and a launder to receive the overflow from said weir.

11. A leaching tank as set forth in claim 10 in which the turbine impeller is provided with an upper set of blades, a lower set of blades and a continuous circular plate disposed intermediate said blade sets so that the lower set operate as pumping blades and the upper set as agitating blades, and an intake conduit extending from outside the tank adjacent the bottom to a point beneath the central portion of said impeller.

References Cited in the file of this patent

UNITED STATES PATENTS

| | | |
|---|---|---|
| 708,494 | Randall | Sept. 2, 1902 |
| 1,373,731 | Hornsey | Apr. 5, 1921 |
| 2,058,300 | Cramer | Oct. 20, 1936 |